United States Patent
Langendorf et al.

(10) Patent No.: US 7,174,436 B1
(45) Date of Patent: Feb. 6, 2007

(54) METHOD AND SYSTEM FOR MAINTAINING SHADOW COPIES OF DATA USING A SHADOW MASK BIT

(75) Inventors: Brian K. Langendorf, Benicia, CA (US); Christopher W. Johnson, Cupertino, CA (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 432 days.

(21) Appl. No.: 10/680,126

(22) Filed: Oct. 8, 2003

(51) Int. Cl.
*G06F 12/16* (2006.01)

(52) U.S. Cl. .................. 711/156; 711/162; 711/147; 714/6

(58) Field of Classification Search ............. None
See application file for complete search history.

(56) References Cited

U.S. PATENT DOCUMENTS

| | | | | |
|---|---|---|---|---|
| 5,202,994 A | * | 4/1993 | Begur et al. ............... | 711/202 |
| 5,603,011 A | * | 2/1997 | Piazza ...................... | 711/170 |
| 5,870,097 A | * | 2/1999 | Snyder et al. ............. | 345/426 |
| 6,128,728 A | * | 10/2000 | Dowling .................... | 712/228 |
| 6,725,341 B1 | * | 4/2004 | Peir et al. .................. | 711/141 |
| 2003/0028746 A1 | * | 2/2003 | Durrant ..................... | 711/206 |
| 2004/0111576 A1 | * | 6/2004 | Arimilli et al. ............ | 711/162 |

* cited by examiner

*Primary Examiner*—B. James Peikari
(74) *Attorney, Agent, or Firm*—Cooley Godward Kronish LLP

(57) ABSTRACT

In a multi-processor, multi-memory system, a technique designates portions of a local memory as being regions to be shadowed. A shadow control unit detects write operations to those regions designated for shadowing. The shadow control unit then executes a cloning of a write operation designated for a local memory region to be shadowed and provides the cloned data to a memory space in system memory which corresponds to the local memory region which is being shadowed.

9 Claims, 6 Drawing Sheets

METHOD AND SYSTEM FOR MAINTAINING SHADOW COPIES OF DATA USING A SHADOW MASK BIT

BACKGROUND

The present invention is directed to a method and apparatus for memory management in a processing system. More particularly, the present invention is directed to a method and apparatus for maintaining shadow copies of data in a multi-processor, multi-memory system or in a single processor system where there is a desire to enhance processor performance.

As processor systems have been designed to perform more complex operations at a faster speed, it has been more common to introduce more processing capabilities to a system by way of employing multiple processing units, some of which have specialized functionality. One arena in which this architecture has been adopted has been in the processing of graphics information.

A schematic diagram providing a high level view of a multi-processor arrangement and a graphics processing system is provided in FIG. 1. A central processing unit 101 is responsible for overseeing the operations of the system as a whole, including the running of various applications on the graphics processing system. A graphics processing unit (GPU) 107 is also provided. This GPU a specialty processor adapted to perform functionality particularly germane to certain graphics requirements for the system. Graphics processing unit 107 has associated therewith a local memory 109. By this arrangement the graphics processing unit can more quickly access information and data necessary graphics for processing without having to access information from the main memory. This improves overall system performance. Furthermore in the arrangement of FIG. 1, a bridge processing unit 105 acts as a bridge or mediator between the CPU controlling the overall operation of the system and the applications run by the system, and the special processing operations being performed by the GPU. In a further system enhancement, developers have taken to including a co-processor such as co-proc 1051 in bridge 105 thereby allowing for certain additional processing operations typically associated with the GPU to be implemented in the bridge and thereby further improve system performance capabilities. A main or system memory 103 is also provided.

In the arrangement of FIG. 1, it is appropriate to have the coprocessor 1051 interoperate with data stored in main memory 103 rather than have it operate with local memory 109. To do the latter would be to decrease system performance by loading additional responsibilities for data transfer on to the GPU 107 thereby diverting time from data processing operations to transaction processing. Therefore, it is more advantageous for the co-proc 1051 to rely on and/or interoperate with the main memory 103 while the GPU 107 is interoperating with data in local memory 109.

When the coprocessor and GPU reference different memories issues can arise with regard to assuring that the coprocessor and GPU are operating on the same data. That is, it is significant that where the co-proc and GPU are intending to be operating on the same information, that the system assure that the information to be used by the co-proc which resides in the main memory matches up with or is consistent with the data that is being used by the GPU stored in local memory.

The potential for differences between the data sets operated on by the coprocessor and a GPU rises significantly where data is produced by or provided by the CPU. An example of this situation is illustrated in a schematic form in FIG. 2 of the application referring to data processed in a graphics processing context. More specifically, in FIG. 2 illustrates a CPU 201 that is responsible for producing information that populates a vertex buffer 202 which is normally utilized in a graphics processing operation. The content of the vertex buffer 202 may be of interest not only to the graphics processing unit 207 but also to the coprocessor solution would be to provide a complete copy of the vertex buffer from the CPU to both the coprocessor and the graphics processing unit. However, it has been determined that such an operation has a negative impact on overall system performance because a substantial amount of transaction processing is involved in writing the information twice, to two separate locations. The negative impact is exacerbated when one considers that some of that additional transaction processing time is expended to write data that is simply not used by the coprocessor at all. Thus the negative affect of the copying of all of the data is amplified by a factor dependent on the extent to which the co-processor uses that entire set of data. Thus it would be beneficial if a technique were provided that would assure data consistency for the operation of the specialty processor, in this graphics environment the GPU, and a coprocessor while at the same time reducing the negative impact on system performance.

SUMMARY OF THE INVENTION

A method and apparatus provide for the selective shadowing of portions of a local memory associated with a specialized processing unit. In accordance with the shadowing operation, a special shadowing unit monitors operations which call for writing data to the local memory. A shadow unit determines whether the requested writing operation implicates a region within the local memory which is selected to be shadowed. If the local memory region is identified as a region to be shadowed, then the shadow unit produces a clone of the write operation prior to conducting the write operation to the local memory associated with the specialty processor. Then the cloned write operation is processed so as to provide data to another memory for subsequent use by a coprocessor. The other memory could be the system or main memory or it could be a second local memory. The cloned write operation is directed to map the data to an address space identified by the system as corresponding in some sense to the local memory region identified in connection with the given write operation in question.

DETAILED DESCRIPTION

Figure 1:
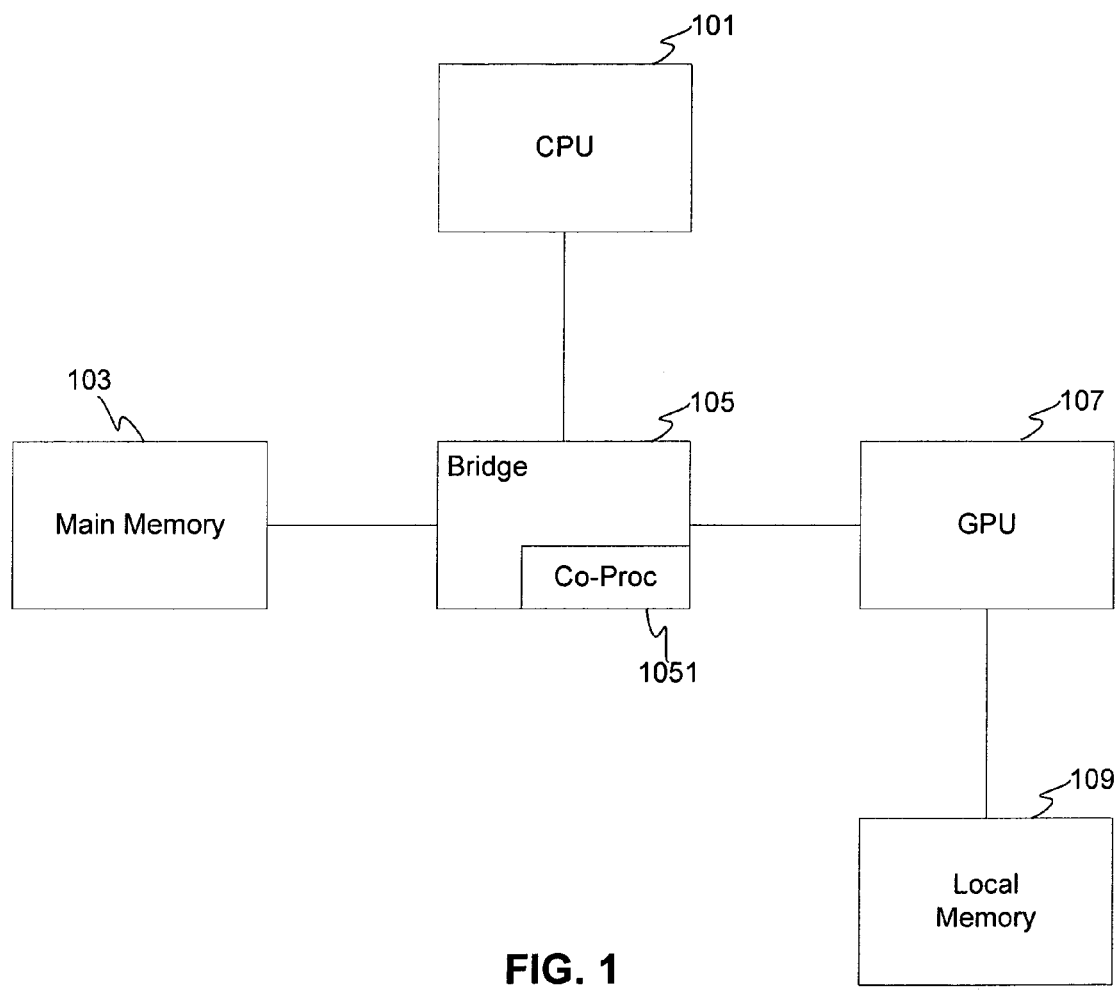
FIG. 1 is a block diagram overview of a multi-processor, multi-memory system.
Figure 2:
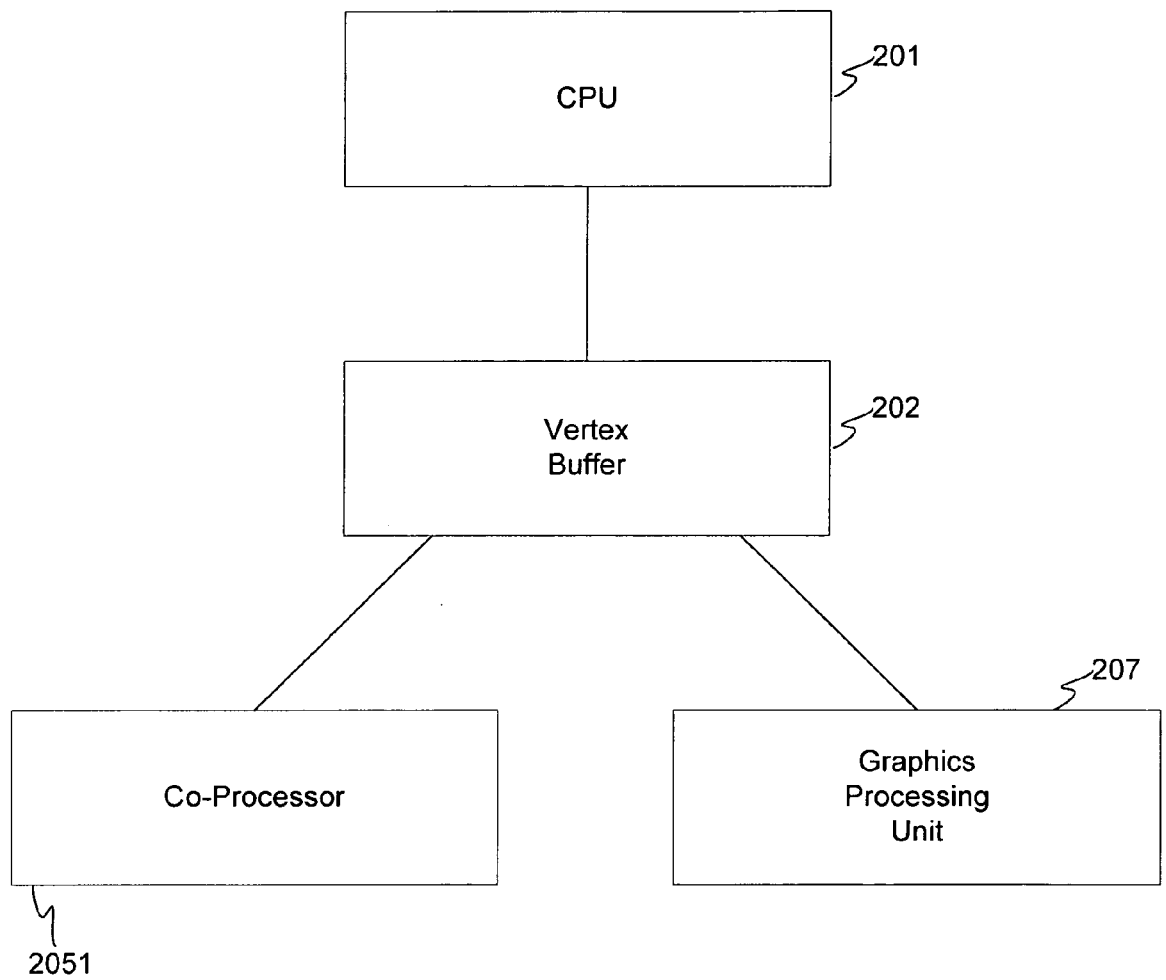
FIG. 2 is a schematic diagram that represents the relationship between data to be shared between elements of FIG. 1.
Figure 3:
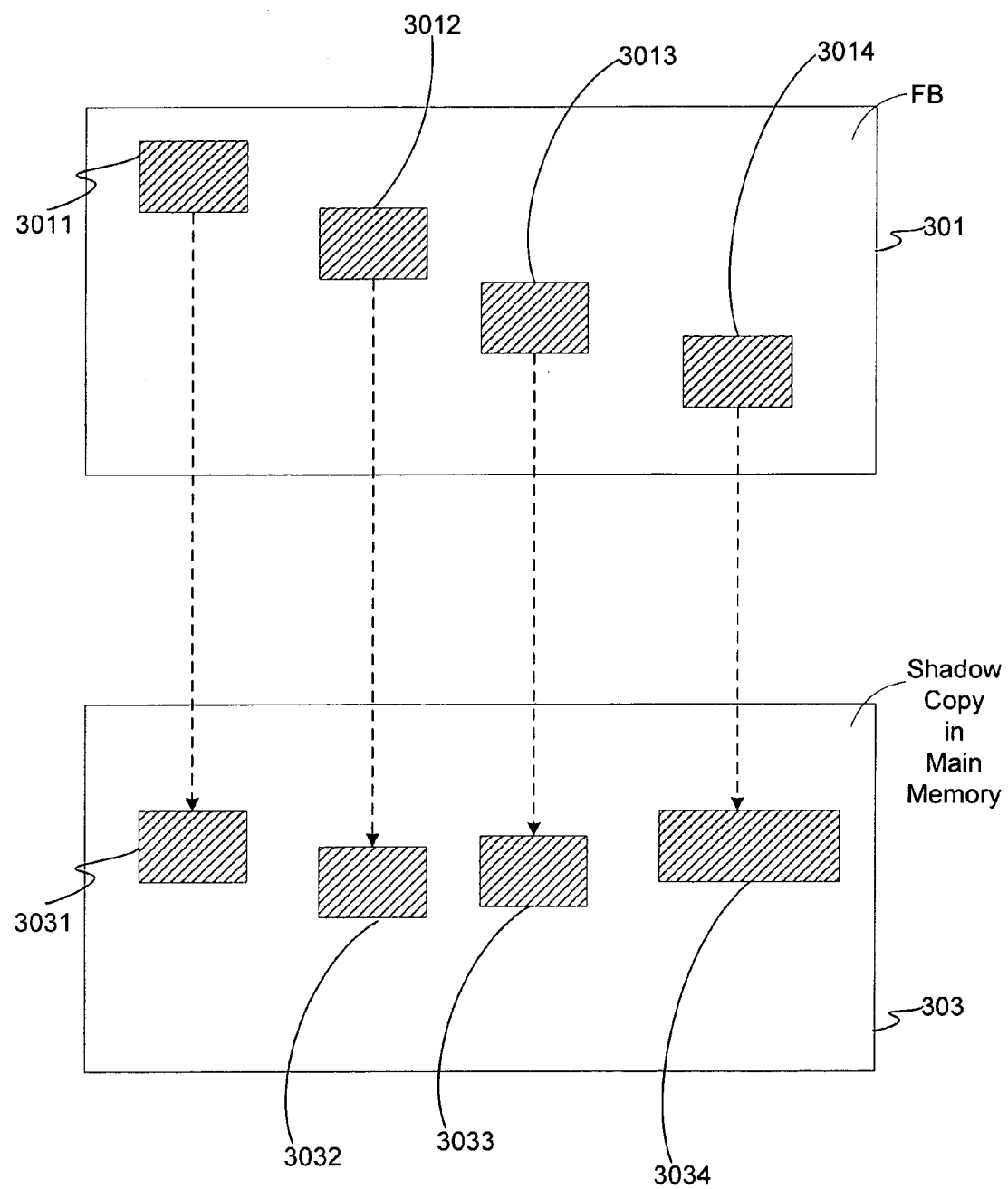
FIG. 3 is a schematic diagram useful for explaining a shadowing operation in accordance with an embodiment of the present invention.

In accordance with the present invention, a technique is provided by which selected portions of a memory can be designated as portions that ought to be shadowed, that is, they are write operations to those designated portions of memory will be detected and cloned to a second memory. In one embodiment that will be described in more detail, the memory to be shadowed is the local memory and the cloned data is provided to the main memory or system memory. Alternative embodiments would include shadowing portions of system memory into a local memory or shadowing portions of a write back memory into a non-local memory such as the non-local video memory. FIG. 3 is useful for illustrating the concept of shadowing portions of memory. In FIG. 3, local memory represented by element 301, which in the case of the graphics processing unit example of FIG. 1 could correspond to a frame buffer (FB), can be thought of as having a plurality of regions. Interspersed among those memory regions are a plurality of regions which contain information which is useful for the coprocessor or secondary processor associated with the multi-processor system. These regions are designated as shaded areas 3011–3014. In the example of FIG. 1 the data in shaded regions 3011–3014 are data that are not only to be operated upon by the GPU 107, but are also to be operated on by the coprocessor 1051. In FIG. 3 element 103 is representative of a portion of main memory which contains information for use by the coprocessor. The figure represents the concept that the shaded regions 3011–3014 are replicated or cloned and stored in the main memory 303 so as to be provided to regions 3031–3034. The dotted lines between the local memory 301 and the main memory portion 303 associated with the coprocessor are merely provided to represent the concept of mapping copies of the data in local memory regions 3011–3014 into the main memory at areas in the main memory corresponding to areas in the local memory.

Thus in accordance with the technique of the present invention, it is not necessary to copy the entirety of the local memory or in this instance the frame buffer associated with the graphics processing unit, into the portion of main memory to be utilized by the coprocessor. Instead, when the CPU directs that a write operation be provided to one of the memory regions in the local memory which is identified as a region to be shadowed, then a shadow unit associated with this system detects this fact and automatically clones the data which are the subject of the write operation. In one embodiment, the cloning occurs then the original write operation is carried out, that is the CPU's instructions for writing data to the various portions of the local memory are executed. In addition, the cloned write operation is executed whereby the data written to the selected portions of the local memory are also written to corresponding portions of the main memory so as to be accessible to the coprocessor which has been provided to enhance system performance. The order of occurrence of cloning, execution of the write and execution of the cloned write can be varied so long as the shadow unit detects the write to a memory portion to be shadowed and executes a cloning of the data so as to assure the accurate shadowing of the designated region.

Figure 4:
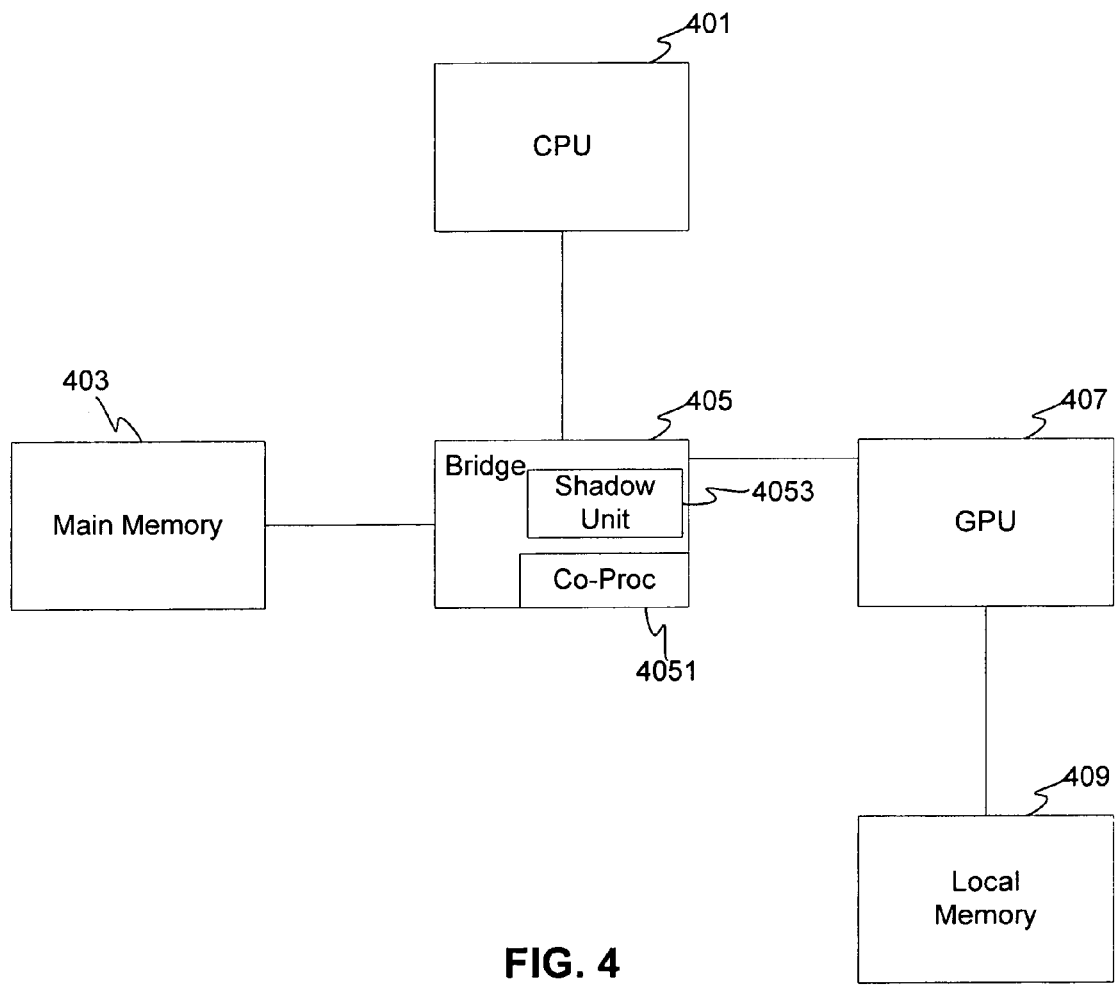
FIG. 4 illustrates a block diagram of a multi-processor, multi-memory arrangement including an embodiment of the present invention.

An example of an arrangement which would perform this operation is illustrated in block diagram form in FIG. 4. In this arrangement which is similar to the arrangement of FIG. 1, a CPU 401 oversees the overall operation of the system and executes various applications which may be run by the multiprocessor, multi-memory system. Furthermore this system includes a secondary processor or specialty processor 407 which in this example is a graphics processing unit to be used in a graphics processing environment. The specialty processing unit utilizes data which is stored in local memory 409. The CPU can write information to the local memory 409 via a write operation processed through bridge 405 and GPU 407. As in the example of FIG. 1, the embodiment of FIG. 4 includes a coprocessor unit that is provided in association with the bridge 405 so as to enhance overall system performance in this multiprocessor, multi-memory arrangement. The coprocessor 4051 utilizes a memory space that resides in main memory 403. In accordance with an embodiment of the present invention, the bridge is modified so as to include a shadow unit 4053. The shadow unit performs a number of operations which are necessary for implementing the selective shadowing of local memory regions to assure that the coprocessor operates on data from the main memory which corresponds to data in the local memory 409. In particular, the shadow unit must detect when the CPU is performing a write operation to the local memory. The shadow unit must then evaluate the write operation to determine whether the write operation implicates a region within the local memory which is to be shadowed. If the write operation does not involve a region to be shadowed, then the operation is simply performed and no operation is performed to modify contents in the main memory at that time. If, however, the shadow unit detects that the CPU write operation is designated to be performed in connection with a region of local memory which is to be shadowed, then the shadow unit must then execute a cloning of the designated write operation. In this cloning operation, the bridge shadow unit must replicate the data associated with the write operation and then determine the appropriate memory space in main memory to which the cloned data should be directed. In one embodiment of the present invention as further described below, a cloned write operation has its data directed to a portion of main memory based on a remapping operation whereby a physical address associated with the local memory is translated into an address in main memory which would be accessible by the coprocessor. Thus, the translation tables create a specific association as between portions of local memory and portions of the system memory based on physical address space translation operations.

In the context of graphics processing both a GPU and a coprocessor will use the vertex buffers and index buffers required to render a frame. However, much of the GPU frame buffer, such as the Z buffer, a front and back color buffer, textures, and other pieces of information are not needed by the coprocessor. As we have indicated, to improve the performance of the GPU all of these data structures are provided in the local memory and yet the frame buffer of the coprocessor, which resides in the system memory must also at least include those data which are used commonly by the GPU and coprocessor such as the vertex buffers and index buffers. Thus to keep track of which regions need to be shadowed, the shadow unit can include a shadow bit mask in its memory mapped I/O. Each bit in this shadow bit mask provides an indication of whether a given block or region of the local memory, for example within the frame buffer, is appropriately shadowed. For example, in one possible memory structure environment, a given bit mask could be a 4 Kb (512B) mask where each bit in the mask corresponds to a 256 KB region of the local memory—in the graphics example a GPU frame buffer. That is, each bit identifies whether that 256 KB region of the local memory is to be shadowed or is not to be shadowed. This shadow bit mask size and delineation of regions in the local memory allows shadowing control over memory regions such as frame buffers as large as 1 GB. For example bit 0 in the bit mask may control the shadowing of the local memory from 0 to 256 KB-1 while bit 1 controls the shadowing of 256 KB to 512 KB-1 and so forth. If the shadow bit mask is in a first state, for example 0, then the associated region is not shadowed. If the shadow bit mask in a second state, for example, 1, the associated region is deemed to be a region that is to be shadowed.

Figure 5:
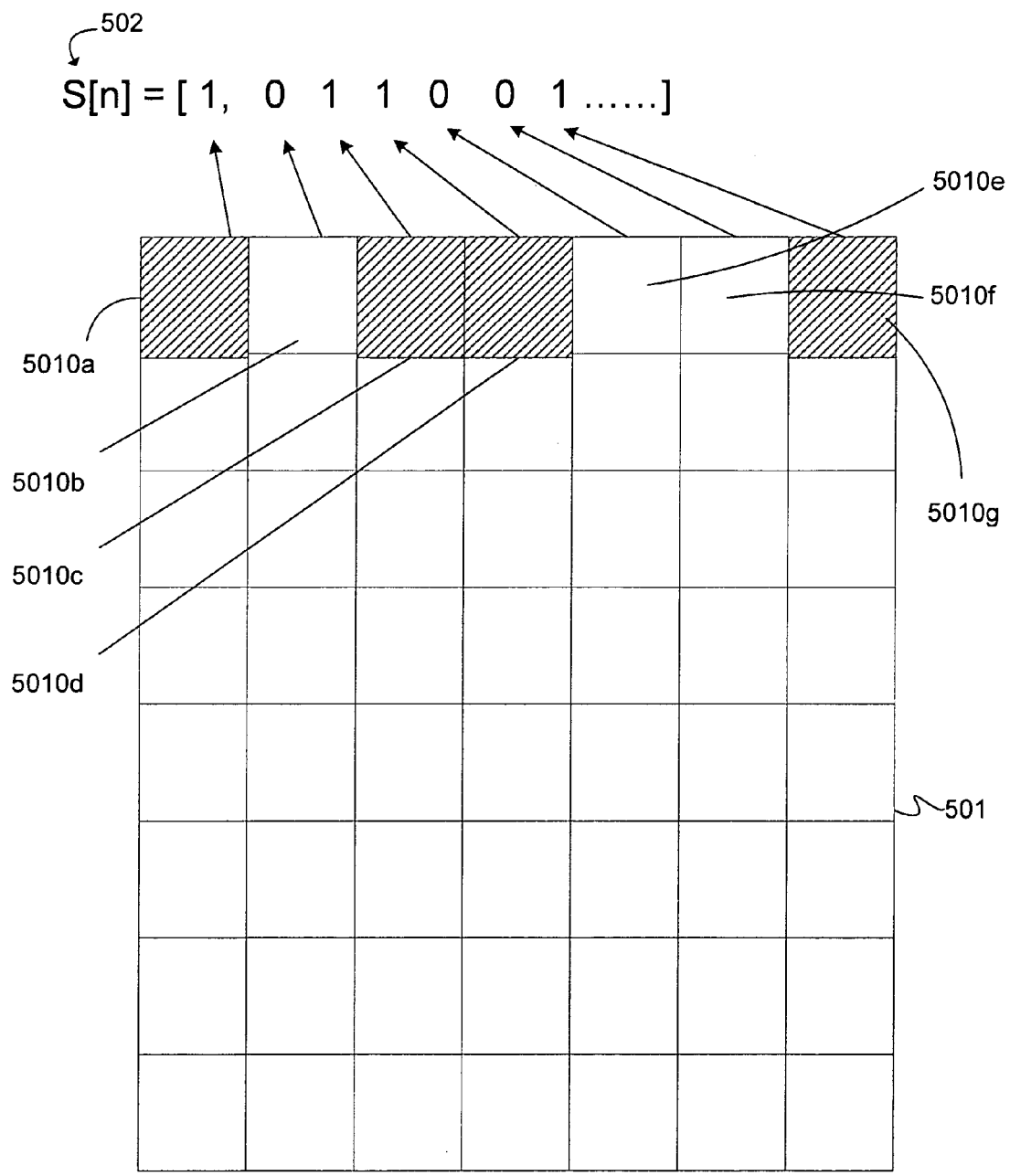
FIG. 5 provides a schematic illustration of an association of memory space and shadow mapping information in accordance with an embodiment of the present invention.

FIG. 5 provides a schematic diagram to show an association between regions of the local memory 501 and a shadow vector 502. As can be seen the local memory can be conceptualized as being divided into a plurality of regions of equal size. The present invention provides that the system can designate which of those plurality of regions 5010 are to be shadowed at any given time. In the example illustrated in FIG. 5, the shaded regions represent those regions which are to be shadowed. The shaded regions then have corresponding bit positions in the shadow vector 502. Using the state values identified in the earlier example then where "1" identifies a region to be shadowed and "0" identifies a region not to be shadowed, then the figure shows how the designated regions shadow characteristics are represented in the shadowing vector 502.

When a write operation is to be performed to local memory region 5010a, then the shadow vector indicates to the shadowing unit that this write operation is directed to a region of the local memory which is to be shadowed. Then the shadow unit will clone the write operation designated for region 5010a and perform the cloned write operation whereby the same data to be stored in region 5010a is presented to the main memory at a designated address to be utilized by the coprocessor. Thus in the example shown where a series of write operations implicate different regions within the local memory only those write operations directed to the shaded regions in local memory 501, that is those regions designated to be shadowed, need to be cloned to the system memory. Thus, for example where a write operation involves regions 5010e and 5010f, there is no write cloning and there is no involvement by the system memory in terms of storing information similar to that which resides in the local memory at least as it concerns those two regions of the local memory. Thus instead of having to replicate all of the data which is to be utilized by the specialty processor and which resides in the local memory, it is appropriate to only copy or clone selected portions of the data for that local memory, that is those selected portions of the local memory which are containing information which is also to be utilized or operated upon by the coprocessor.

Figure 6:
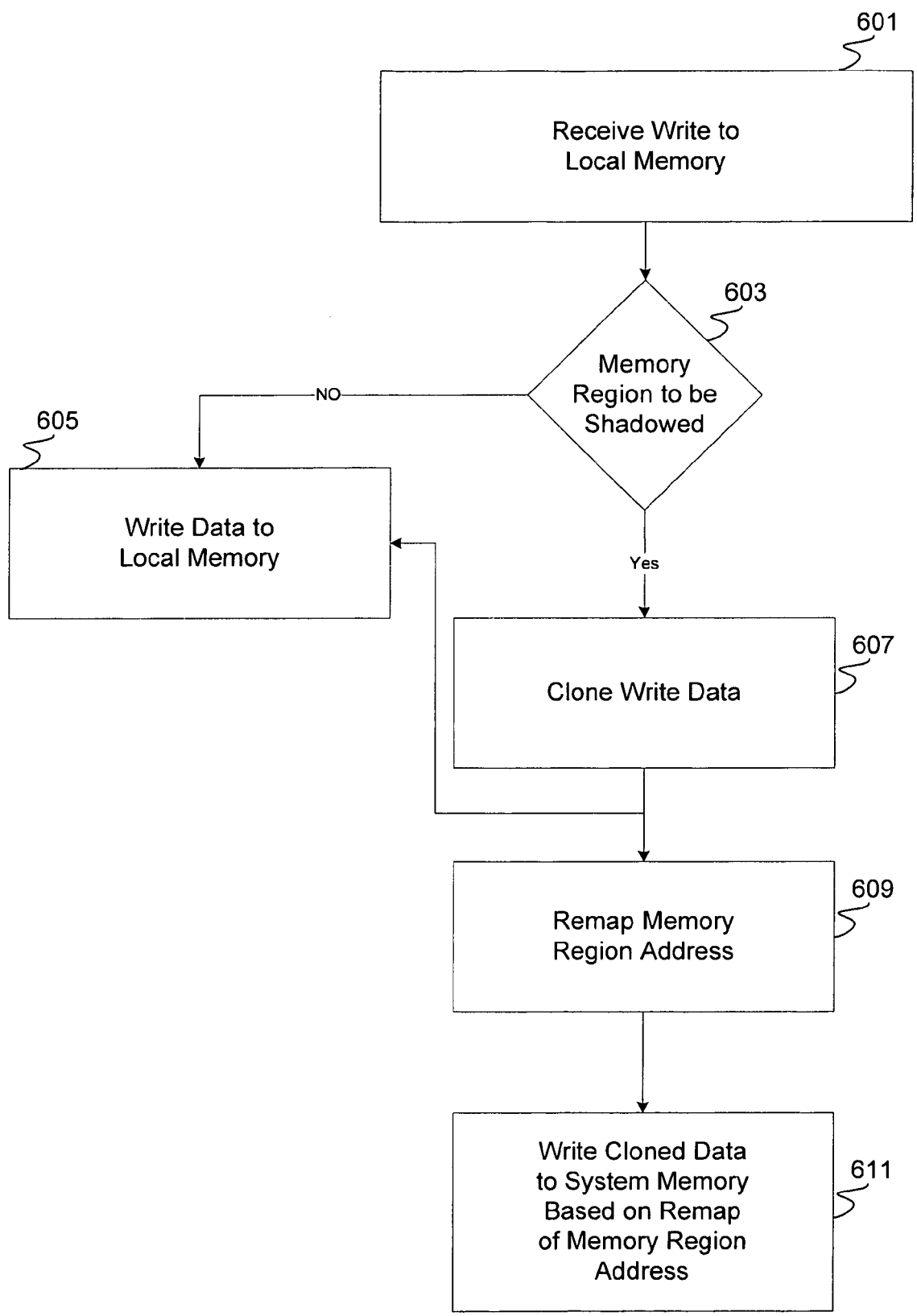
FIG. 6 describes a process flow associated with an embodiment of the present invention.

FIG. 6 illustrates a process flow which might be utilized in connection within an embodiment of the present invention and in particular with a shadow unit as illustrated in FIG. 4 of the present application. The shadow unit will detect or receive a write to the local memory from the CPU, 601. The shadow unit then detects whether the memory region identified as part of the write operation is a memory region which has been identified as a region to be shadowed, 603. This operation can be performed in accordance with one embodiment utilizing a shadow vector or bit mask as described above in relationship to FIG. 5. In particular, the shadow control unit can examine whether the memory region designated for the write operation has a corresponding shadow bit that is in a state that either designates the region as one to be shadowed or indicates that it is a region not to be shadowed. The invention can utilize the state representation described above in connection with the example of FIG. 5. Alternatively, opposite state information for the bits could be utilized to designate which memory regions are to be copied or shadowed and which memory regions are not to be shadowed. If the shadow control unit determines that the memory region designated by the write operation is not to be shadowed, then the write operation is simply executed whereby the designated data is written to the appropriate location in local memory 605. If the local memory region is to be shadowed, then the shadow control unit executes a clone write data operation, 607. After cloning the write data operation, the system writes the designated data to the local memory in the appropriate region identified in the write operation, 605. In addition, the shadow control unit remaps the memory region address from the local memory address to a physical address associated with the system memory portion corresponding to the coprocessor thereby designating that region in system memory to which the cloned data should be written, 609. The shadow control unit then manages the writing of the cloned data to the system memory based on the remapping of the memory region address, 611.

In accordance with an embodiment of the present invention, the cloned writes to the shadowed regions of the local memory, in the example shown, the shadowed regions of the GPU frame buffer, are passed through a Shared Remapping TLB. This allows the shadow copy to be placed anywhere in system memory. In this way structures that need to be shadowed can be allocated without restriction in the GPU frame buffer and the associated shadow copies can be placed without restriction in the coprocessor frame buffer which resides in system memory. In one possible implementation, the shared remapping TLB also provides the physical address to physical address remapping services for references to the AGP aperture (GART), CP frame buffer (GTLB) and in addition to the shadowed regions of the GPU frame buffer (GFRT). The SRTLB is a translation cache that consists of a single pool of translations. Its size and associativity are a matter of design choice. Alternative remapping configurations could execute this operation. For example, a dedicated remapper, separate from that for the AGP, frame buffer, etc., could be provided.

The present invention provides a shadow unit which includes the necessary hardware for appropriately designating regions of the local memory which need to be shadowed and then performing a write operation to both local memory and to system memory where the local memory region of interest is designated as a region to be shadowed.

The present invention has been described in the context of a graphics processing unit. However, the invention can be employed in other multi-processor, multi-memory configurations where a different specialty processor unit is utilized other than a graphics processing unit. In any of the other arrangements where a specialty processor has associated therewith a local memory and another processor needs to have access to a subset of the information which is to be stored in the local memory associated with the specialty processor, then the present invention can be employed to designate regions of the local memory to be shadowed and then to execute an appropriate cloning of a write operation so as to maintain a data consistency between the region to be shadowed in the local memory and the memory space which is to be utilized by a secondary processor operating to enhance the system performance of the specialty processor. For example, the invention can apply to a situation where an initiating agent, such as a CPU in the following examples, writes to a single address, targeting a single resource. The write is identified as targeting a region which has an associated shadow and the shadow is automatically updated by the shadowing hardware. This could apply for instance where a CPU writes to a non-local video memory and have a copy automatically made in the write back memory, which is higher performance for the CPU to read back. Also, writes to a memory mapped I/O of a device (e.g., an I/O controller) could be shadowed so that the CPU could read back from memory the current configuration and last command given to the device.

What is claimed is:

1. A method for enhancing memory access in a multiple processing unit system including a central processing unit, a second processor, a local memory associated with the second processor and a system memory, the method comprising:
    associating a shadow mask bit and a region of the local memory;
    identifying the region of the local memory as a region for shadowing by placing the associated shadow mask bit in a first state;
    designating data written into said region as data being used by multiple processors including said second processor;
    detecting a write operation to the region of local memory by the central processing unit;
    detecting that the shadow mask bit associated with the region is in said first state;
    cloning the write operation; and
    writing the cloned write operation to system memory.

2. The method of claim 1 wherein the writing the cloned write operation comprises
    translating an address of the first region in local memory to an address in system memory; and
    storing data from the write operation to the address resulting from the translating operation.

3. The method of claim 1 further comprising:
    associating a second region of the local memory with a second shadow mask bit;
    identifying the second region of the local memory as a region that is not to be shadowed by placing the associated second shadow mask bit in a second state;
    detecting a write operation to the second region of local memory by the central processing unit;
    detecting that the second shadow mask bit is in the second state; and
    processing the write operation to the local memory without creating a shadow copy of the write operation in the system memory.

4. The method of claim 3 further comprising:
    resetting the second shadow mask bit to the first state;
    detecting a second write operation to the second region of local memory;
    detecting that the second shadow mask bit is in the first state;
    cloning the second write operation to the second region of local memory; and
    writing the cloned second write operation to system memory.

5. The method of claim 1 wherein the writing the cloned write operation comprises:
    performing a single translation of an address in local memory to a single translated address in system memory; and
    storing data from the write operation in a translated region specified by said single translated address.

6. The method of claim 1 wherein writing the cloned write operation includes diverting access by another of said multiple processors from said local memory to said system memory.

7. The method of claim 6 wherein diverting access of said another of said multiple processors includes reducing data traffic between said local memory and said second processor, thereby enhancing system performance.

8. A memory system comprising:
    a central processing unit;
    a second processor;
    a local memory associated with said second processor;
    a shadow unit coupled to said central processing unit and including a shadow bit mask having a plurality of bits, each bit associated with a region of the local memory designated to store data used by multiple processors including said second processor; and
    an address translator coupled to said shadow unit.

9. The system of claim 8 wherein said address translator includes a translation cache having a pool of translations.

* * * * *